United States Patent [19]
Crane et al.

[11] Patent Number: 5,943,006
[45] Date of Patent: Aug. 24, 1999

[54] RF IMAGE RECONSTRUCTION AND SUPER RESOLUTION USING FOURIER TRANSFORM TECHNIQUES

[75] Inventors: Patrick E. Crane, 6101 Johns Rd., Suite 6, Tampa, Fla. 33634; E. Calvin Johnson, Tampa, Fla.

[73] Assignee: Patrick E. Crane, Tampa, Fla.

[21] Appl. No.: 08/956,101

[22] Filed: Oct. 24, 1997

Related U.S. Application Data

[60] Provisional application No. 60/029,356, Oct. 25, 1996.

[51] Int. Cl.$^6$ .................................................. G01S 7/292
[52] U.S. Cl. ............................................ 342/196; 342/25
[58] Field of Search ............................... 342/25, 196, 54, 342/159, 162, 179, 192, 194, 197

[56] References Cited

U.S. PATENT DOCUMENTS

| | | | |
|---|---|---|---|
| 4,107,673 | 8/1978 | Gross et al. | 342/185 |
| 4,137,530 | 1/1979 | Hooker, Jr. | 342/176 |
| 4,191,957 | 3/1980 | Walker et al. | 342/190 |
| 4,238,797 | 12/1980 | Shreve | 342/368 |
| 4,707,697 | 11/1987 | Coulter et al. | 342/25 |
| 4,758,838 | 7/1988 | Maeda et al. | 342/25 |
| 4,929,954 | 5/1990 | Elleaume | 342/194 |
| 5,019,824 | 5/1991 | Kumar | 342/195 |
| 5,043,734 | 8/1991 | Niho | 342/25 |
| 5,095,313 | 3/1992 | Patel et al. | 342/91 |
| 5,122,805 | 6/1992 | Peterman et al. | 342/26 |
| 5,155,606 | 10/1992 | Landesman | 359/29 |
| 5,185,815 | 2/1993 | Brandsetter | 382/31 |
| 5,198,748 | 3/1993 | Tsui et al. | 342/99 X |
| 5,227,801 | 7/1993 | Pierce | 342/192 |
| 5,237,329 | 8/1993 | Bamler et al. | 342/25 |
| 5,367,579 | 11/1994 | Javidi et al. | 382/31 |
| 5,392,046 | 2/1995 | Hughes | 342/22 |
| 5,448,053 | 9/1995 | Rhoads | 250/201.9 |
| 5,448,245 | 9/1995 | Takase | 342/195 |
| 5,471,435 | 11/1995 | Marschall | 367/135 |
| 5,477,382 | 12/1995 | Pernick | 359/559 |
| 5,485,160 | 1/1996 | Suganuma | 342/195 |
| 5,499,029 | 3/1996 | Bashforth et al. | 342/22 |
| 5,504,487 | 4/1996 | Tucker | 342/90 |
| 5,510,799 | 4/1996 | Wishart | 342/373 |
| 5,519,399 | 5/1996 | Greene et al. | 342/14 |
| 5,532,699 | 7/1996 | Smith | 342/195 |
| 5,717,218 | 2/1998 | Coufal et al. | 250/492.2 |
| 5,736,958 | 4/1998 | Turpin | 342/179 |
| 5,740,276 | 4/1998 | Tomko et al. | 382/210 |

*Primary Examiner*—John B. Sotomayor
*Attorney, Agent, or Firm*—James Creighton Wray; Meera P. Narasimhan

[57] ABSTRACT

Special mathematical techniques are used to process accurate energy measurements in the focal plane of a high quality imaging system to produce high resolution images. The improved resolution exceeds the generally accepted Rayleigh limits. That is accomplished by adapting Fourier transform techniques and using both in-phase and quadrature or amplitude and phase components to recover the target scene. The measurement of the in-phase and quadrature or amplitude and phase components are taken in the focal plane and undergo parallel processing to preserve both amplitude and phase in the resulting image. A Fourier transform of the aperture characteristics is removed from a Fourier transform of the energy components to result in a Fourier transform of the image. The scene is recovered by taking an inverse Fourier transform of the result.

16 Claims, 6 Drawing Sheets

FIG. 1

Block diagram representation of the system transform relationships.

RF IMAGE RECONSTRUCTION AND SUPER RESOLUTION USING FOURIER TRANSFORM TECHNIQUES

This application claims the benefit of Provisional U.S. application number 60/029,356, filed Oct. 25, 1996.

BACKGROUND OF THE INVENTION

This disclosure describes a novel method for producing high-quality images of remote target scenes. The images are constructed from RF measurements made in the focal plane of a suitable imaging system. Mathematical processing of the measurements using Fourier transform techniques is used to compensate for the limitations of practical imaging systems and provide greatly enhanced resolution The method visualizes a target scene consisting of a multitude of RF sources, all of the same frequency but having different amplitudes and phases. Alternatively, the target scene may consist of a multitude of reflectors or scatterers, all illuminated by a single source of single-frequency RF energy. The method further visualizes a lens or more general optical imaging system that focuses RF energy from the scene onto its focal plane. The amplitude and phase of this RF energy are measured at a number of points in the focal plane by an array of sensors, a single sensor that scans across the focal plane, or a combination of these techniques. An image of the original target scene is then reconstructed from these measurements.

If the imaging optics were perfect in a system as just described, the remote scene would be represented directly by the measurements made in the focal plane. In a practical system, however, the imaging optics and its associated aperture introduce diffraction effects and other aberrations which limit the usefulness of the raw image. It is the purpose of the method described herein to overcome these limitations to the greatest extent practical. This is done by performing certain mathematical operations on the, basic focal-plane measurements as part of the process of reconstructing the image. These operations utilize the techniques of Fourier transform theory and analysis.

SUMMARY OF THE INVENTION

As previously indicated, the target scene to be imaged may be thought of as a set of scatterers, arbitrarily located within the field of view and serving as sources of coherent RF energy, typically as reflected from a transmitter. Each source is characterized by a complex number having real and imaginary parts that represent the magnitudes of the in-phase and quadrature components, respectively, and in-turn the amplitude and phase, of the energy associated with that source.

The target scene is represented as $s(x,y)$, where x and y are coordinates in a reference plane associated with the scene (or suitably scaled angular coordinates), and s is a complex-valued function of the two coordinates. Its two-dimensional Fourier transform is defined as:

$$S(u, v) = \int\!\!\int_{-\infty}^{+\infty} s(x, y) e^{-i2\pi(ux+vy)} dx\, dy \qquad (1)$$

Target Scene Transform

The inverse transform is:

$$s(x, y) = \int\!\!\int_{-\infty}^{+\infty} S(u, v) e^{i2\pi(ux+vy)} du\, dv \qquad (2)$$

Scene (Inverse Transform)

In this pair of expressions, u and v are spatial frequency variables, and S in general is complex. The only difference in the form of the direct and inverse transforms is the sign of the exponent.

The imaging system including its associated aperture cause a field distribution to be produced in the focal plane which may be represented as $p(x,y)$, with the transform:

$$P(u, v) = \int\!\!\int_{-\infty}^{+\infty} p(x, y) e^{-i2\pi(ux+vy)} dx\, dy \qquad (3)$$

Focal-Plane Transform and the corresponding inverse transform:

$$p(x, y) = \int\!\!\int_{-\infty}^{+\infty} P(u, v) e^{i2\pi(ux+vy)} du\, dv \qquad (4)$$

Inverse Transform

In this discussion, lower case letters such as "s" and "p" above are used to represent distributions in geometric space. Upper case letters are used for the corresponding Fourier transforms, "S" and "P". In general, both types of functions are complex-valued, The variables x and y have their ordinary meaning as coordinates in geometric space. In these representations, no distinction is made between the x and y coordinates for the scene and those for the focal plane or other distributions, it being assumed that context is sufficient to identify the variables in a particular case, or that all such variables are scaled to a common reference. The same is true of the spatial frequency variables, u and v.

The combination of the aperture and the imaging optics may be characterized in a number of ways. For our purpose, it is convenient to use the spatial spread function, $a(x,y)$, analogous to the impulse response of an electrical network. The squared magnitude of this function, $|a(x,y)|^2$ is commonly called the "point spread function." As discussed below, the Fourier transform of $a(x,y)$ serves as the transfer function for the optics, analogous to the input-output transfer function of an electrical or mechanical system. Thus:

$$A(u, v) = \int\!\!\int_{-\infty}^{+\infty} a(x, y) e^{-i2\pi(ux+vy)} dx\, dy \qquad (5)$$

Aperture Transform and:

$$a(x, y) = \int\!\!\int_{-\infty}^{+\infty} A(u, v) e^{i2\pi(ux+vy)} du\, dv \qquad (6)$$

Inverse Transform

The spatial spread function, $a(x,y)$, by definition is the distribution in the focal-plane resulting from a plane wave of uniform intensity impinging on the aperture. The plane wave in turn may be considered to be the result of a point source in the scene at infinity. A second point source off axis would result in a second plane wave arriving at the off-axis angle. This in turn would produce a second spread function, centered at a point in the focal plane corresponding to the angle of arrival. The combined effect in the focal plane of the two plane waves would be the superposition of the individual spread functions. In this superposition, the real and imaginary parts (or in-phase and quadrature components) combine separately.

A real-life target scene can be thought of as a multitude of individual point sources, each characterized by an amplitude and phase. In general, the resulting focal-plane distribution can be constructed as the two-dimensional convolution of the scene elements with the aperture spread function:

$$p(x, y) = \int\int_{-\infty}^{+\infty} s(x', y')a(x-x', y-y')dx'dy' \quad (7)$$

Convolution

It then follows from established fourier transform concepts that the transform of p(x,y) is equivalent to the product of the transforms of s(x,y) and a(x,y):

$$P(u,v)=S(u,v)A(u,v) \quad (8)$$

Figure 1:
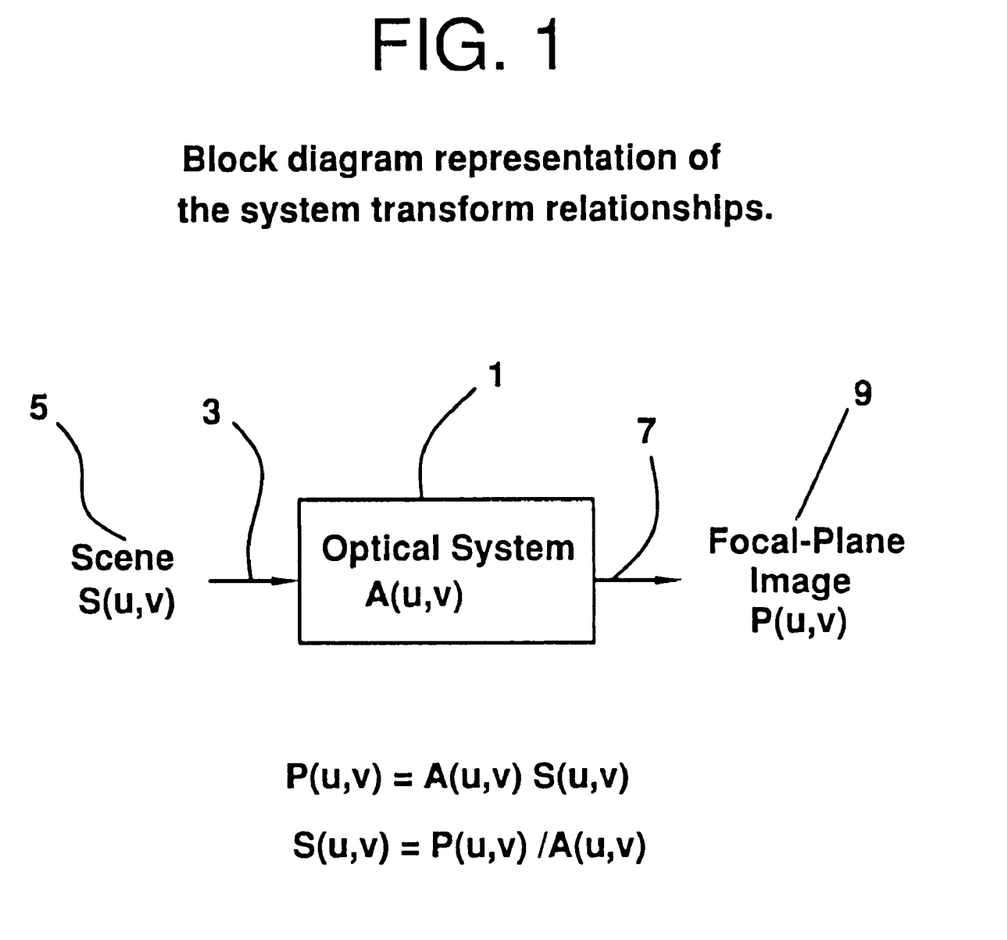
FIG. 1 is a block diagram representation of the system transform relationship.

FIG. 1 is a block diagram representation of this relationship, analogous to the diagrams of classical one-dimensional linear systems theory involving time and frequency.

In the current invention, the object is to re-construct the target scene from measurements made in the focal plane. The first step, then, is to measure the field distribution in the focal plane (in-phase and quadrature components) using techniques known to those skilled in the art. From this measured distribution, p(x,y), we compute the Fourier transform, P(u, v). We also calculate or measure the point-spread distribution for the aperture and imaging optics, a(x,y). The transform, A(u,v), is determined from this. The scene transform is then calculated by dividing, the focal-plane transform by the aperture transform:

$$S(u,v)=P(u,v)\div A(u,v) \quad (9)$$

The scene itself is obtained by computing the inverse transform:

$$s(x, y) = \int\int_{-\infty}^{+\infty} S(u, v)e^{i2\pi(ux+vy)}du\,dv \quad (10)$$

Scene Re-construction

From a practical viewpoint, the above operations must all be done numerically, working with a finite set of data— measurements of the focal-plane distribution. For this purpose, we use the two-dimensional discrete transform counterparts of the above relationships. These are typically defined in terms of double summations instead of double integrals and with variables valued only at discrete points. The transform pair corresponding to Equations 1 and 2 above is:

$$S(u, v) = M^{-1}N^{-1}\sum_{x=0}^{M-1}\sum_{y=0}^{N-1} s(x, y)e^{-i2\pi(ux/M+vy/N)} \quad (11)$$

Discrete Transform $$s(x, y) = M^{-1}N^{-1}\sum_{u=0}^{M-1}\sum_{v=0}^{N-1} S(u, v)e^{i2\pi(ux/M+vy/N)} \quad (12)$$

Inverse Transform

In these expressions, the coordinates x, y, u, and v have been re-scaled to take on the integer values from 0 to M−1 or N−1. A common special case is the square array, with M=N. For this case, the transform pair is frequently written in more symmetrical form:

$$S(u, v) = N^{-1}\sum_{x=0}^{N-1}\sum_{y=0}^{N-1} s(x, y)e^{-i2\pi(ux+vy)/N} \quad (13)$$

Discrete Transform $$s(x, y) = N^{-1}\sum_{u=0}^{N-1}\sum_{v=0}^{N-1} S(u, v)e^{i2\pi(ux+vy)/N} \quad (14)$$

Inverse Transform

This square form of the array is the usual choice for the present purpose. Typically, the arrays are 64×64 (64 elements in each direction) or 128×128, although the method is not limited to these values.

In a practical system utilizing the method described above, special attention to computational details is needed. It should be noted, for example, that with the definitions above, the data arrays are not centered about 0, but rather about N/2 (approximately). It is also worth noting that s and S are implicitly periodic functions in x,y and u,v, with the period N.

Thus the entire x-y plane, for example, if viewed from afar would appear as a checkerboard of s(x,y) patterns repeating in both directions. This is particularly significant in dealing with shifting operations such as convolution or correlation. In these cases, it is frequently desirable to double the size of the array and pad out the edges with zeros, in order to avoid the confusion of undesired overlapping or edge effects.

In summary, what is described above is an approach to radar imaging based on accurate RF measurements in the focal plane of a high quality optical imaging system and special mathematical techniques for processing those measurements to produce images having resolution well beyond the generally accepted Rayleigh limits. The novelty of this approach is in part the adaptation of Fourier transform techniques to the radar imaging problem.

The present method uses both in-phase and quadrature components of energy in the focal plane to represent the target scene. The measurement of both components in the focal plane and the parallel processing of those components preserves both amplitude and phase in the resulting image.

The invention is a method for using special mathematical techniques to process accurate energy measurements in the focal plane of a high quality imaging system to produce high resolution images. The improved resolution exceeds the generally accepted Rayleigh limits. That is accomplished in one example by adapting Fourier transform techniques and using both in-phase and quadrature amplitude and phase components to recover the target scene. The measurements of the in-phase and quadrature or amplitude and phase components are taken in the focal plane and undergo parallel processing to preserve both amplitude and phase in the resulting image.

In lieu of Fourier transforms, other mathematical processes may be used, such as for example convolution and deconvolution integrals.

A radar application economically obtains tight range resolution and angular resolution of the scene with a single frequency using arbitrary pulse widths to recreate the scene in height, width and depth.

Current radars get good results in range resolution using short pulse width or large band widths. Angular resolutions in current radars are generally limited by or are close to the Rayleigh limits.

A preferred method of recreating an image of a target includes measuring focal plane energy distribution of in-phase and quadrature components or amplitude and phase components. A mathematical function of the measured components is computed. A mathematical function of aperture characteristic is removed from the computed function of the measured components. A resulting function is produced, and an image of the target is recovered from the resulting function.

The computing of a mathematical function includes computing a Fourier transform of the measured components. The removal of the mathematical function operates by removing a Fourier transform of the aperture characteristic from the Fourier transform of the measured components.

The removal divides the Fourier transform of the measured components by the Fourier transform of the aperture characteristic. The producing includes producing a Fourier transform of the image. The image recovering includes applying an inverse Fourier transform to the Fourier transform of the image.

The mathematical function of the aperture characteristic is determined, measured or calculated. Preferably the determining, measuring or calculating produces a Fourier transform of the aperture characteristic.

A preferred method of recreating images of targets in a collimated or focused energy system includes measuring or calculating an aperture characteristic and generating a complex Fourier transform of the aperture characteristic. A target scene is illuminated and energy is reflected from the target. Focal plane distribution of reflected energy components at the focal plane is measured in amplitude and phase or in phase and quadrature using multiple probes in motion or in an array of receiver probes. A complex Fourier transform of the measured distribution is calculated. The calculated complex Fourier transform of the measured components is divided by the complex Fourier transform of the aperture characteristic and the complex Fourier transform of the scene is obtained. An inverse complex Fourier transform is taken of the complex Fourier transform of the scene. The scene is recovered from the inverse complex Fourier transform of the scene, thereby resolving the scene independently of aperture size. The resolving is dependent only on accuracy and fineness with which the focal plane is sampled.

A preferred method of recovering a scene in a collimator includes the steps of obtaining a complex Fourier transform of an aperture characteristic of a collimator or microscope. Energy distribution is measured in a focal plane. A complex Fourier transform of the energy distribution is created. The complex Fourier transform of the collimator or microscope is removed from the complex Fourier transform of measured energy distribution. A complex Fourier transform of a scene is recovered. An inverse complex Fourier transform is performed on the complex Fourier transform of the scene. Output of the inverse complex Fourier transform is used as a reconstructed scene.

In one preferred embodiment, measuring includes measuring in-phase and quadrature components or amplitude and phase components of energy in the focal plane.

A preferred scene extraction apparatus includes a collimator or microscope having an aperture for conducting energy from a remote scene to a focal plane. An array of receptors in the focal plane receives energy in the receptors. Receivers are connected to the array for measuring in-phase and quadrature components or amplitude and phase components at each receptor. A Fourier transform generator is connected to the receivers for creating a Fourier transform of the energy distribution component. A divider is connected to the Fourier transform generator for removing aperture characteristics. An inverse Fourier transform generator is connected to the divider for recovering a scene.

The receivers can be in parallel, arranged in two dimension and are coherent with the transmitter. A preferred array of receptors is an array of receiving antenna probes.

These and further and other objects and features of the invention are apparent in the disclosure, which includes the above and ongoing written specification, with the claims and the drawings.

DETAILED DESCRIPTION OF THE PREFERRED EMBODIMENTS

FIG. 1 is an analogous mathematical function representation of an optical system 1 for wave energy, for example radar, visual, X-ray, sonar or sound energy. A function of energy distribution 3 is received from the functionally represented scene or source 5. The optical system 1 directs energy components 7 to a focal plane 9.

Figure 2:
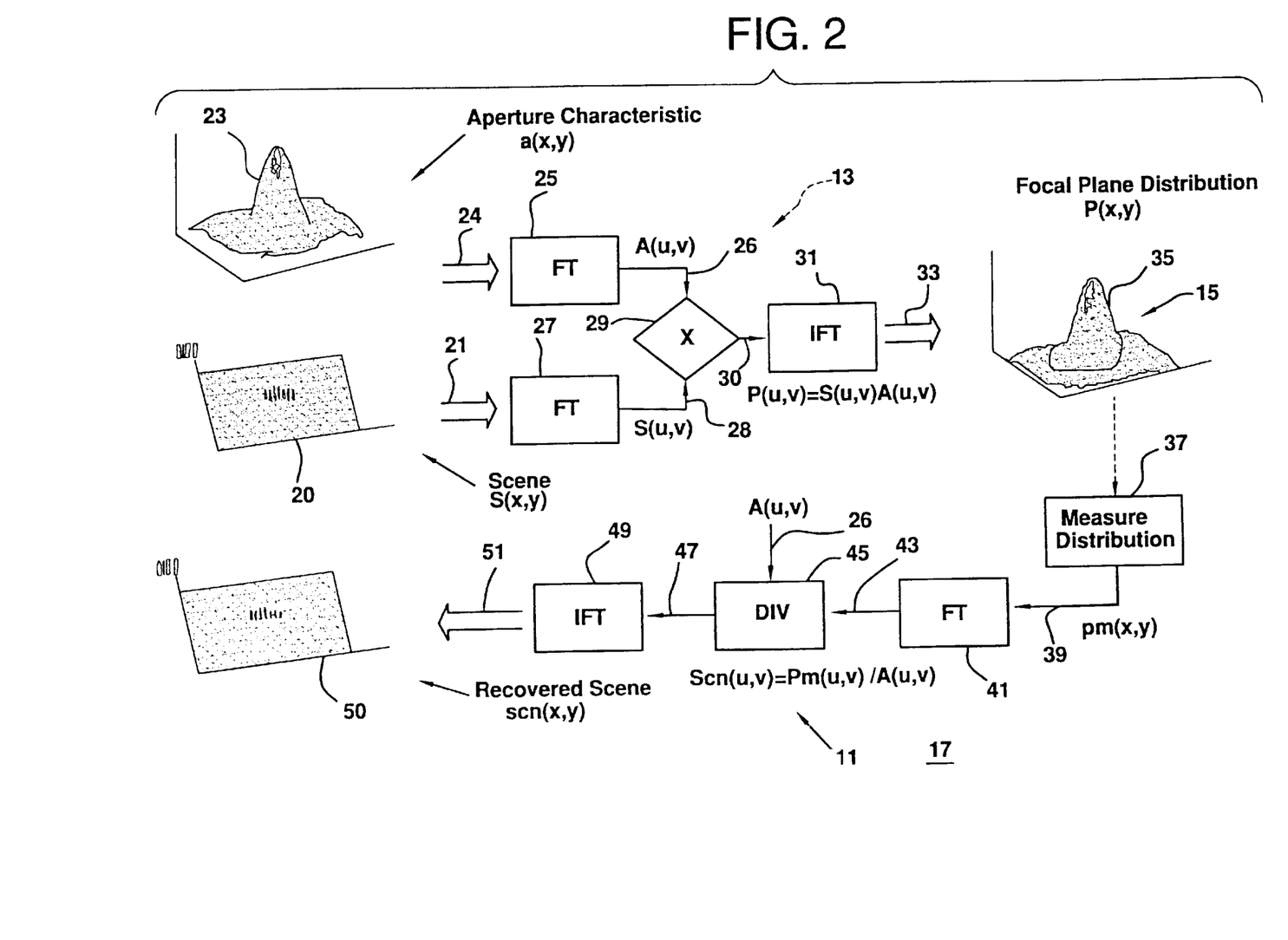
FIG. 2 is a schematic representation of scene extraction algorithm and simulation.

FIG. 2 shows an arrangement 11 with a functionally represented antenna or lens optical system 13, a data gathering system 15 and a signal processing system 17. A scene, target or source 20 provides an energy distribution 21 to the optical system.

An aperture of the optical system has an aperture characteristic 23, which is imposed 24 on the optical system.

A Fourier transform 25 represents the contribution 26 of the aperture characteristic.

A Fourier transform 27 represents the contribution 28 of the scene. Multiplied together 29, they produce a product 30 which is the Fourier transform of the focal plane energy distribution.

The inverse Fourier transform 31 produces the focal plane energy distribution 33 which is shown three-dimensionally 35.

The distribution measurement 37 schematically represents receptors and receivers at the focal plane, which provide in-phase and quadrature components or amplitude and phase components to produce the measured distribution 39.

The signal processor 17 has a Fourier transform generator 41 which creates a Fourier transform 43 of the measured distribution.

The divider 45 divides the measurement Fourier transform 43 by the aperture characteristic Fourier transform 26, producing a Fourier transform 47 of the scene. The inverse Fourier transform generator 49 produces the recovered scene 50, which is represented by arrow 51.

Figure 3:
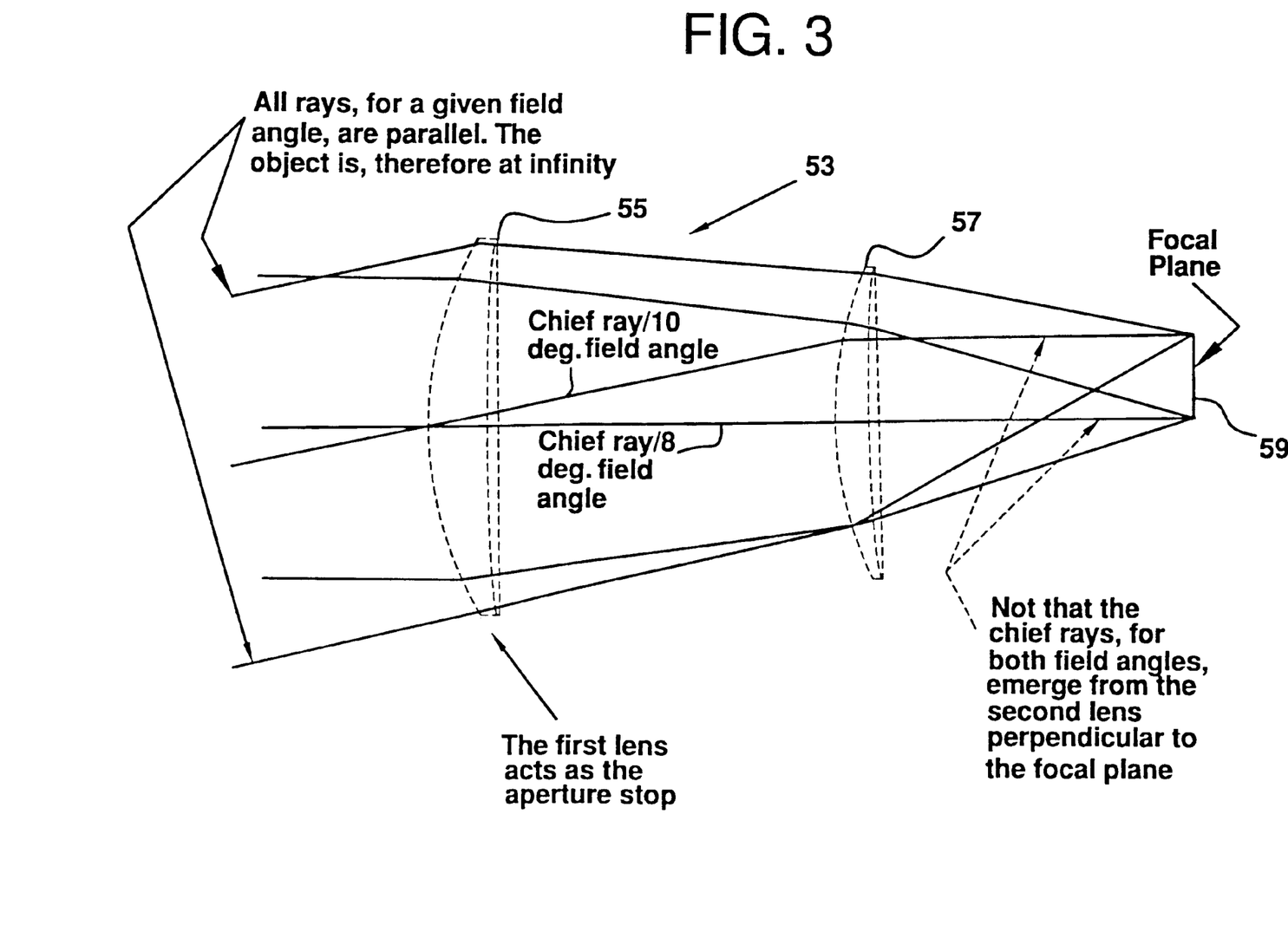
FIG. 3 is a schematic representation of a baseline optical system.

In FIG. 3, a telecentric lens system 53 is shown. Lenses 55 and 57 tend to focus all rays on a flat focal plane 59. The chief rays for both field angles shown emerge from the second lens perpendicular to focal plane 59.

Figure 4:
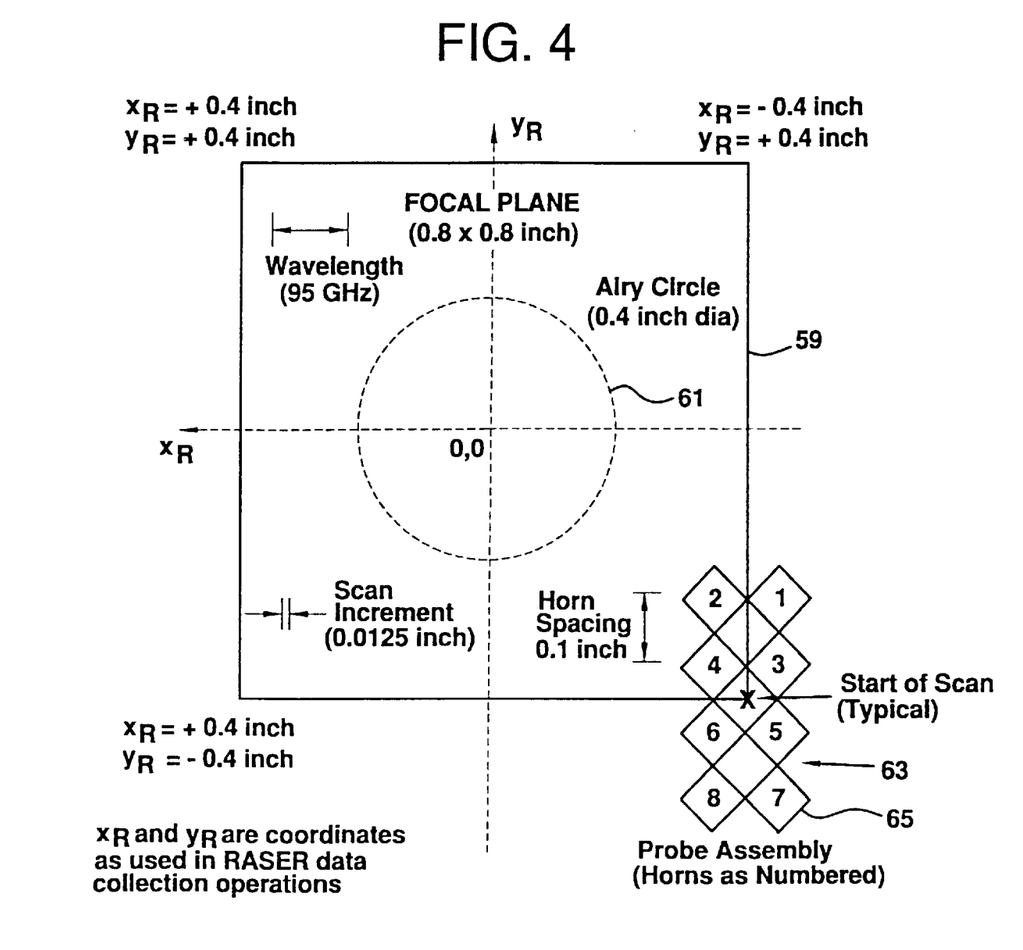
FIG. 4 shows an example of a flat focal plane with one of the many Airy circles depicted at its center and a scanning multiple horn probe assembly.

FIG. 4 shows an example of a flat focal plane 59 with one of the many Airy circles 61 depicted at its center and a scanning multiple horn probe assembly 63. The probe assembly 63 moves smoothly or in step by step increments across the focal plane.

Figure 5:
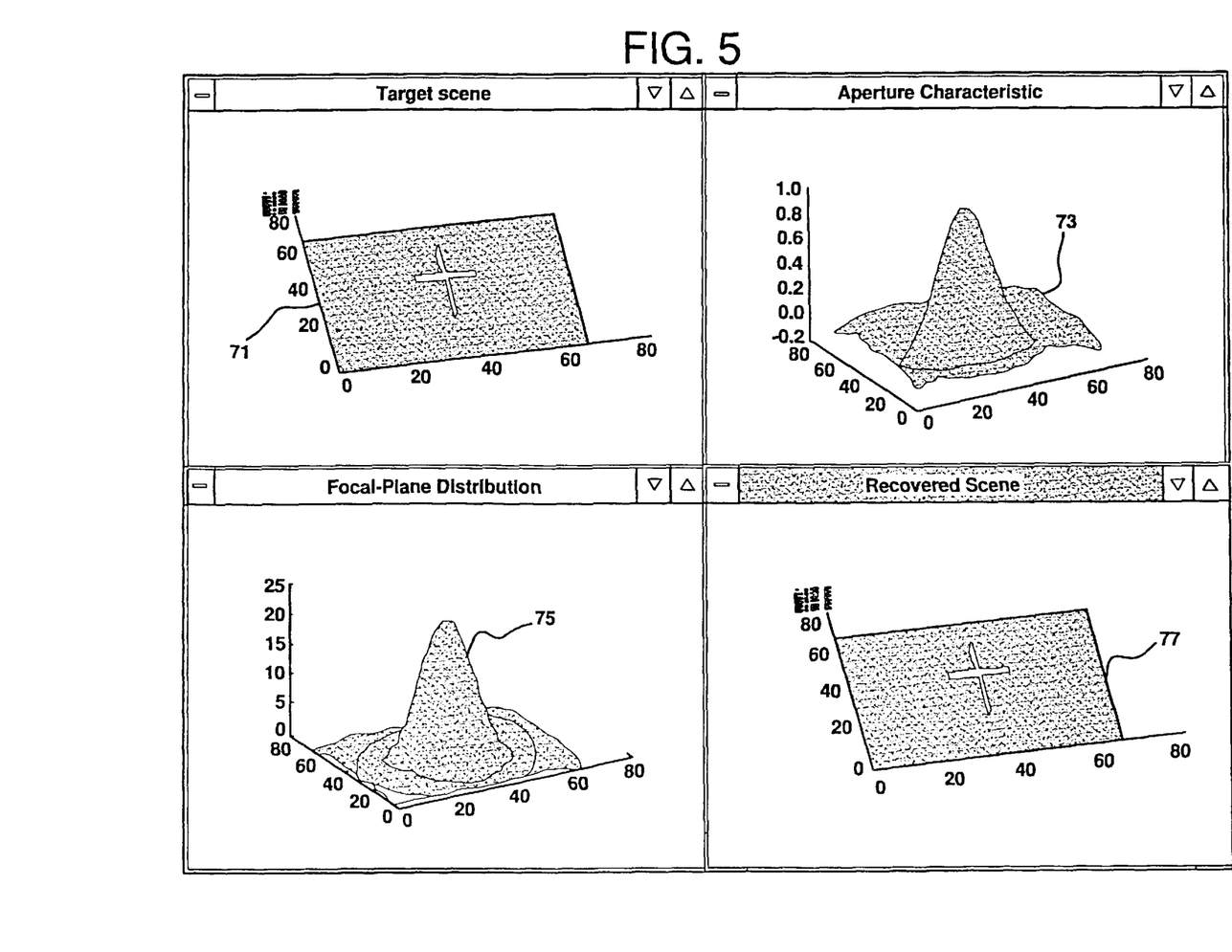
FIG. 5 is a schematic representation of scene extraction.

The assembly shown has eight square horn probes 65 arranged in a diamond pattern to eliminate or reduce mutual coupling. Sizes and increments shown in the drawing are used in one example In FIG. 5 the fine details of the target scene are shown in three dimensions at 71. The aperture characteristic 73 is shown in three dimensions. Energy at the focal plane is shown at 75. The scene cannot be seen. By removing the aperture characteristic 73 the scene is recovered, as shown at 77.

Figure 6:
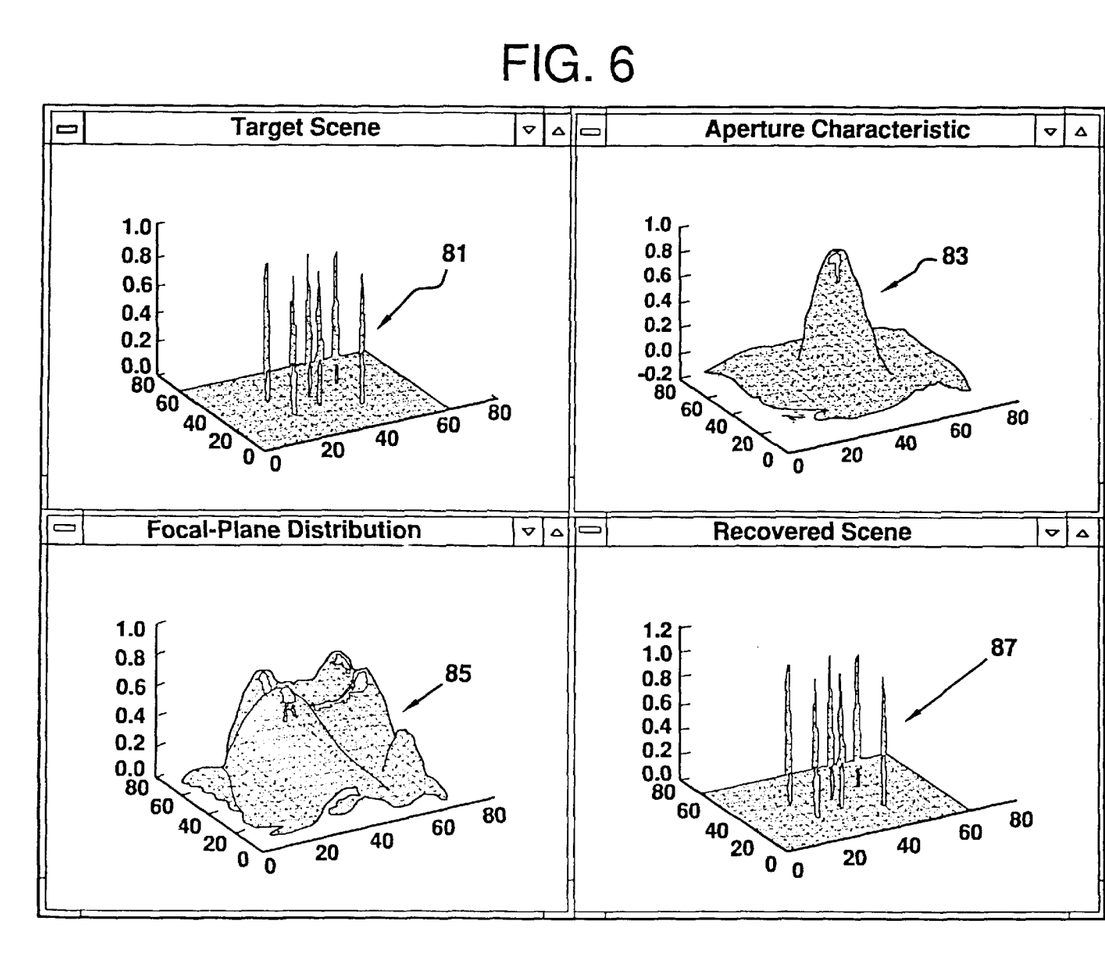
FIG. 6 is a schematic representation of another scene extraction.

FIG. 6 shows another example. The target scene 81 contains several small features which are masked by the aperture characteristic 83. The energy distribution 85 at the focal plane cannot show the scene. When the aperture characteristic is removed, the scene is recovered 87.

While the invention has been described with reference to specific embodiments, modifications and variations of the invention may be constructed without departing from the scope of the invention.

We claim:

1. A method of recreating an image of a target, comprising measuring focal plane energy distribution of in-phase and quadrature components or amplitude and phase components, computing a mathematical function of the measured components, dividing a mathematical function of aperture characteristic into the computed function of the measured components, producing a resulting function, and recovering an image of the target from an inverse mathematical process of the resulting function.

2. The method of claim 1, wherein the computing of a mathematical function comprises computing a Fourier transform of the measured components.

3. The method of claim 2, wherein the dividing of the mathematical function comprises dividing a Fourier transform of the aperture characteristic into the Fourier transform of the measured components.

4. The method of claim 2, wherein the dividing of the Fourier transform comprises dividing the Fourier transform of the measured components by the Fourier transform of the aperture characteristic, and wherein the producing comprises producing a Fourier transform of the image.

5. The method of claim 4, wherein the recovering comprises generating an inverse Fourier transform from the Fourier transform of the image.

6. The method of claim 1, further comprising determining, measuring or calculating the mathematical function of the aperture characteristic.

7. The method of claim 6, wherein the determining, measuring or calculating comprises producing a Fourier transform of the aperture characteristic.

8. A method of recreating images of targets in a collimated or focused energy system, comprising measuring or calculating an aperture characteristic, generating complex Fourier transform of the aperture characteristic, illuminating a target scene, measuring focal plane energy distribution components of amplitude and phase or of in-phase and quadrature using multiple probes in motion or in an array of receiver probes, calculating complex Fourier transform of the measured distribution, dividing the calculated complex Fourier transform of the measured components by the complex Fourier transform of the aperture characteristic, obtaining the complex Fourier transform of the scene, taking an inverse complex Fourier transform of the complex Fourier transform of the scene, recovering the scene from the inverse complex Fourier transform of the scene, thereby resolving the scene independently of aperture size, the resolving being dependent only on accuracy and fineness with which the focal plane is sampled.

9. A method of recovering a scene in a collimator, comprising the steps of obtaining a complex Fourier transform of an aperture characteristic of a collimator or microscope, measuring energy distribution in a focal plane, creating a complex Fourier transform of the measured energy distribution, dividing the complex Fourier transform of the collimator or microscope aperture characteristic into the complex Fourier transform of measured energy distribution, recovering a complex Fourier transform of a scene, generating an inverse complex Fourier transform of the scene from the complex Fourier transform of the scene, and using output of the inverse complex Fourier transform as a reconstructed scene.

10. The method of claim 9, wherein the measuring comprises measuring in-phase and quadrature components or amplitude and phase components of energy in the focal plane.

11. A scene extraction apparatus, comprising a collimator or microscope having an aperture for conducting energy from a remote scene to a focal plane, an array of receptors in the focal plane for receiving energy in the receptors, receivers connected to the array for measuring in-phase and quadrature components or amplitude and phase components at each receptor, a Fourier transform generator connected to the receivers for creating a Fourier transform of the energy distribution components, a divider connected to the Fourier transform generator for dividing the Fourier transform of the energy distribution components by a Fourier transform of aperture characteristics, and an inverse Fourier transform generator connected to the divider for recovering a scene.

12. The apparatus of claim 11, wherein the receivers are in parallel.

13. The apparatus of claim 11, wherein the receivers are arranged in two dimensions.

14. The apparatus of claim 11, wherein the receivers are coherent with a transmitter.

15. The apparatus of claim 11, wherein the array of receptors is an array of receiving antenna probes.

16. The apparatus of claim 11, wherein the focal plane is flat.

* * * * *

UNITED STATES PATENT AND TRADEMARK OFFICE
CERTIFICATE OF CORRECTION

PATENT NO. : 5,943,006

DATED : August 24, 1999

INVENTOR(S) : Patrick E. Crane and E. Calvin Johnson

It is certified that error appears in the above-identified patent and that said Letters Patent is hereby corrected as shown below:

<u>In the Drawings</u>:
The title page should be deleted to be replaced with the attached title page.
Replace Figures 2 and 3 with the attached correct formal drawings.

Signed and Sealed this

Eleventh Day of April, 2000

*Attest:*

Q. TODD DICKINSON

*Attesting Officer*   *Director of Patents and Trademarks*

United States Patent
Crane et al.

[11] Patent Number: 5,943,006
[45] Date of Patent: Aug. 24, 1999

[54] RF IMAGE RECONSTRUCTION AND SUPER RESOLUTION USING FOURIER TRANSFORM TECHNIQUES

[75] Inventors: Patrick E. Crane, 6101 Johns Rd., Suite 6, Tampa, Fla. 33634; E. Calvin Johnson, Tampa, Fla.

[73] Assignee: Patrick E. Crane, Tampa, Fla.

[21] Appl. No.: 08/956,101

[22] Filed: Oct. 24, 1997

Related U.S. Application Data

[60] Provisional application No. 60/029,356, Oct. 25, 1996.

[51] Int. Cl.$^6$ .................................................. G01S 7/292
[52] U.S. Cl. ............................................. 342/196; 342/25
[58] Field of Search .............................. 342/25, 196, 54, 342/159, 162, 179, 192, 194, 197

[56] References Cited

U.S. PATENT DOCUMENTS

| | | | |
|---|---|---|---|
| 4,107,673 | 8/1978 | Gross et al. | 342/185 |
| 4,137,530 | 1/1979 | Hooker, Jr. | 342/176 |
| 4,191,957 | 3/1980 | Walker et al. | 342/190 |
| 4,238,797 | 12/1980 | Shreve | 342/368 |
| 4,707,697 | 11/1987 | Coulter et al. | 342/25 |
| 4,758,838 | 7/1988 | Maeda et al. | 342/25 |
| 4,929,954 | 5/1990 | Elleaume | 342/194 |
| 5,019,824 | 5/1991 | Kumar | 342/195 |
| 5,043,734 | 8/1991 | Niho | 342/25 |
| 5,095,313 | 3/1992 | Patel et al. | 342/91 |
| 5,122,805 | 6/1992 | Peterman et al. | 342/26 |
| 5,155,606 | 10/1992 | Landesman | 359/29 |
| 5,185,815 | 2/1993 | Brandsetter | 382/31 |
| 5,198,748 | 3/1993 | Tsui et al. | 342/99 X |
| 5,227,801 | 7/1993 | Pierce | 342/192 |
| 5,237,329 | 8/1993 | Bamler et al. | 342/25 |
| 5,367,579 | 11/1994 | Javidi et al. | 382/31 |
| 5,392,046 | 2/1995 | Hughes | 342/22 |
| 5,448,053 | 9/1995 | Rhoads | 250/201.9 |
| 5,448,245 | 9/1995 | Takase | 342/195 |
| 5,471,435 | 11/1995 | Marschall | 367/135 |
| 5,477,382 | 12/1995 | Pernick | 359/559 |
| 5,485,160 | 1/1996 | Suganuma | 342/195 |
| 5,499,029 | 3/1996 | Bashforth et al. | 342/22 |
| 5,504,487 | 4/1996 | Tucker | 342/90 |
| 5,510,799 | 4/1996 | Wishart | 342/373 |
| 5,519,399 | 5/1996 | Greene et al. | 342/14 |
| 5,532,699 | 7/1996 | Smith | 342/195 |
| 5,717,218 | 2/1998 | Coufal et al. | 250/492.2 |
| 5,736,958 | 4/1998 | Turpin | 342/179 |
| 5,740,276 | 4/1998 | Tomko et al. | 382/210 |

*Primary Examiner*—John B. Sotomayor
*Attorney, Agent, or Firm*—James Creighton Wray; Meera P. Narasimhan

[57] ABSTRACT

Special mathematical techniques are used to process accurate energy measurements in the focal plane of a high quality imaging system to produce high resolution images. The improved resolution exceeds the generally accepted Rayleigh limits. That is accomplished by adapting Fourier transform techniques and using both in-phase and quadrature or amplitude and phase components to recover the target scene. The measurement of the in-phase and quadrature or amplitude and phase components are taken in the focal plane and undergo parallel processing to preserve both amplitude and phase in the resulting image. A Fourier transform of the aperture characteristics is removed from a Fourier transform of the energy components to result in a Fourier transform of the image. The scene is recovered by taking an inverse Fourier transform of the result.

16 Claims, 6 Drawing Sheets

FIG. 2

FIG. 3